(12) United States Patent
Fernandes et al.

(10) Patent No.: US 9,704,169 B2
(45) Date of Patent: Jul. 11, 2017

(54) DIGITAL PUBLICATION MONITORING BY GEO-LOCATION

(71) Applicant: ECHOSEC SYSTEMS LTD., Victoria (CA)

(72) Inventors: James Conal Fernandes, Victoria (CA); Karl Alexander Swannie, Victoria (CA); Nicholas James Turner, Victoria (CA); Michael Robert Anderson, Victoria (CA); Jason Paul Jubinville, Nanaimo (CA)

(73) Assignee: ECHOSEC SYSTEMS LTD., Victoria (CA)

( * ) Notice: Subject to any disclaimer, the term of this patent is extended or adjusted under 35 U.S.C. 154(b) by 0 days.

(21) Appl. No.: 14/337,238

(22) Filed: Jul. 22, 2014

(65) Prior Publication Data

US 2015/0031399 A1 Jan. 29, 2015

Related U.S. Application Data

(60) Provisional application No. 61/857,337, filed on Jul. 23, 2013.

(51) Int. Cl.
*H04N 5/76* (2006.01)
*H04N 5/225* (2006.01)
(Continued)

(52) U.S. Cl.
CPC ..... *G06Q 30/0201* (2013.01); *G06F 17/3087* (2013.01); *G06F 17/30943* (2013.01);
(Continued)

(58) Field of Classification Search
None
See application file for complete search history.

(56) References Cited

U.S. PATENT DOCUMENTS

| | | | |
|---|---|---|---|
| 7,783,980 B1 * | 8/2010 | Herold | G06Q 10/107 715/740 |
| 8,484,224 B1 | 7/2013 | Harris et al. | |

(Continued)

OTHER PUBLICATIONS

Maceachren, et al (2011). Geo-twitter analytics: Applications in crisis management. Proceedings of the 25th international cartographic conference. Paris, France.

*Primary Examiner* — Moustapha Diaby
(74) *Attorney, Agent, or Firm* — Michael J. Andri

(57) ABSTRACT

A digital publication monitoring by geo-location is disclosed. A server system obtains publication information from one or more server devices of one or more publication data providers, for example, via respective APIs of the publication data providers. The publication information includes geo-location data. The server system stores the publication information in a database in association with the geo-location data. The server system authenticates a client and receives a query initiated by the client. The query indicates a geo-location or a geo-region of interest. The server system references the database to retrieve applicable publication information based on and responsive to the query for the geo-location or geo-region of interest. The server system responds to the query by initiating a response to the client containing response information that includes or is based on the retrieved publications for the geo-location or geo-region of interest.

6 Claims, 9 Drawing Sheets

(51) Int. Cl.
  *H04W 24/00* (2009.01)
  *G06Q 30/02* (2012.01)
  *H04W 4/02* (2009.01)
  *G06F 17/30* (2006.01)
  *H04W 4/18* (2009.01)
  *G06F 21/10* (2013.01)
  *H04W 12/08* (2009.01)
(52) U.S. Cl.
  CPC ............ *G06F 21/10* (2013.01); *H04W 4/021* (2013.01); *H04W 4/185* (2013.01); *G06F 2221/2101* (2013.01); *G06F 2221/2111* (2013.01); *H04W 12/08* (2013.01)

(56) References Cited

U.S. PATENT DOCUMENTS

| | | |
|---|---|---|
| 8,595,317 B1 | 11/2013 | Harris et al. |
| 8,612,533 B1 | 12/2013 | Harris et al. |
| 8,639,767 B1 | 1/2014 | Harris et al. |
| 8,655,873 B2 | 2/2014 | Mitchell et al. |
| 8,655,983 B1 | 2/2014 | Harris et al. |
| 8,849,935 B1 | 9/2014 | Harris et al. |
| 9,077,675 B2 | 7/2015 | Harris et al. |
| 9,077,782 B2 | 7/2015 | Harris et al. |
| 9,258,373 B2 | 2/2016 | Harris et al. |
| 2003/0172270 A1* | 9/2003 | Newcombe et al. .......... 713/168 |
| 2009/0005021 A1* | 1/2009 | Forstall et al. ............. 455/414.3 |
| 2009/0199229 A1* | 8/2009 | Gupta et al. ..................... 725/32 |
| 2009/0260060 A1* | 10/2009 | Smith ................... H04L 63/105 726/3 |
| 2011/0320935 A1* | 12/2011 | Piersol et al. ................. 715/255 |
| 2012/0284326 A1* | 11/2012 | Ennis ..................... G06Q 10/06 709/203 |
| 2014/0330770 A1* | 11/2014 | Yerli ................. G06F 17/30867 707/609 |
| 2015/0242898 A1* | 8/2015 | Gupta ................ G06Q 30/0261 705/14.54 |

\* cited by examiner

| Ships | 420 | |
|---|---|---|
| Vessel 422 | | Type 424 |
| NAVY ESCORT 1 | | [object OBJECT] |
| BIG HORN | | [object OBJECT] |
| USNS COMFORT | | Medical Transport |
| A 189 | | Military Operation |
| SUSAN MC ALLISTER | | Towing |
| DANIEL MCALLISTER | | Tug |
| OOCL ANTWERP | | Cargo Ship |

| Foursquare 430 | | | |
|---|---|---|---|
| Location 432 | 434 Here Now | 436 Total Checkins | 438 Total Users |
| NEX Naval Station Norfolk | 3 | 9029 | 2560 |
| NEX Fuel | 1 | 429 | 172 |
| Commander, Navy Region Mid-Atlantic | 0 | 262 | 17 |
| Naval Station Norfolk | 0 | 1322 | 430 |
| Gate 5 | 0 | 1615 | 286 |
| Norfolk Commissary | 0 | 2093 | 597 |
| Building C-9 | 0 | 1122 | 301 |
| Starbucks | 0 | 907 | 324 |
| McCormick Gym | 0 | 533 | 114 |
| Pier 3T | 0 | 196 | 18 |

| Twitter | 440 | |
|---|---|---|
| Name | Tweet | Date |
| Mike Reed | @AbbeyHilton Paddy is the correct one. | 18 March 2013 8:24:45 AM PDT |
| Darren Walton | Happy Birthday @jeromewilliams enjoy your day!!! | 17 March 2013 7:34:22 AM PDT |

FIG. 4

```
700  start
710  if (readyForData)
720      fetchDataFromSources
730      normalizeData
740      storeMetadataInDatabase
750      cacheContentInDatabase
760  goto start
```

FIG. 7

```
800  start
810  authenticateUser
820  getUserRequest
830  if (userHasPermission)
840      retrieveData
850      returnDataToClient
860  end
```

FIG. 8

DIGITAL PUBLICATION MONITORING BY GEO-LOCATION

FIELD OF THE INVENTION

The present invention pertains to the field of monitoring digital publications based on their geographic associations.

BACKGROUND

As of this application, there are over 700 million digital publications being published every day. Digital publications come in various forms and can be images, text, video, links, or other digitally publishable material. Digital publication data providers include a plurality of sources such as social networking services, publication aggregation services, news services, weblogs, Closed-circuit television (CCTV) camera feeds etc. Often these digital publications are associated with a geographic location or geographic region. Some geographic associations with publications are performed manually by users, while other geographic associations are performed by data providers or a user's client device, depending on context. For example, a user may manually "check-in", comment upon, photograph or capture video from a geographic location or region, while the data provider and/or a user's client device may automatically associate a geographic location or region identifier with a user's publication. Data providers collect and distribute vast amounts of publications having geographic associations.

Today, digital publications exert tremendous influence over the way people around the world, of all ages, obtain and share information. In North America alone, more than 60 percent of Internet-connected individuals participate in publishing text, images and video on a daily basis. Publication data providers such as Facebook™, Twitter™, Foursquare™ Panoramio™, Instagram™, Goolge+™, Sina Weibo™, Flickr™, Picasa™, and other social networking services, publication aggregation services, news services, and weblogs are drawing millions of people each day who want to read messages from friends, and share and post text, images, and videos.

The rise of digital publications have coincided with the advancement of mobile technology. Smartphones, which combine the functionality of a telephone, camera, and personal computer into a single, portable device, have enabled people to share text, images, or videos from almost anywhere, with anyone, at any time. The mobility and portability of such devices have caused publication data providers to adopt and support the association (e.g., tagging) of publications with geo-location information. It is now possible to identify publications from within a particular geographic region (i.e., geo-region) or within a threshold proximity (e.g., radius) to a particular geographic location (i.e., geo-location) based on the geo-location information that is associated with the various forms of publications.

SUMMARY OF THE INVENTION

In accordance with the present invention, a system for digital publication monitoring by geo-location is disclosed. In one example, a server system connected to a network obtains publication information, which includes one or more digital publications and associated meta-data, from one or more server devices of one or more publication data providers. The publication information can be obtained via respective application programming interfaces (APIs) of the publication data providers. The publication information often includes geo-location data. The server system normalizes the publication information obtained including any geo-location data and then stores the publication information in a database in association with the geo-location data and other publication associated meta-data.

Further in accordance with the present invention, a server system supports user interaction by authenticating a client, using an appropriate security model, such as Role Based Access Control, Biba, etc, and receiving a query initiated by the client. The query indicates a geo-location or a geo-region of interest, and can include one or more additional filter parameters, such as a date/time filter, username filter, keyword filter, etc. The server system references the database to retrieve applicable publication information based on and responsive to the query for the geo-location or geo-region of interest. The server system responds to the query by initiating a response to the client containing response information that includes or is based on the retrieved publications for the geo-location or geo-region of interest. The server system supports annotations of publications. The server system further supports the sharing of publications, queries and annotations to secondary instances of the client.

It will be appreciated that this Summary describes only some of the concepts covered in greater detail in the following Detailed Description and associated drawings. As such, claimed subject matter is not limited to the contents of this Summary.

BRIEF DESCRIPTION OF DRAWINGS

The drawings illustrate aspects of the invention, and should not be construed as restricting the scope of the invention in any way.

FIG. 4 depicts another exemplary graphical user interface for presenting publication information for a geo-location or geo-region of interest.

FIG. 7 is a pseudo code description of the server backend.

FIG. 8 is a pseudo code description of the server frontend data request.

DETAILED DESCRIPTION

Definitions

The term "data provider" includes any provider of digital data including individual users, businesses, government institutions, educational institutions, social networking services (such as Facebook™, Twitter™, Foursquare™, Panoramio™ Instagram™, Goolge+™, Sina Weibo™, Flickr™, Picasa™), publication aggregation services, news services, weblogs, and CCTV camera feeds by way of example.

The term "network" and "data network" can be used interchangeably without limiting their meaning, and can include devices connected to a network wirelessly through connections such as 2G, 3G, 4G, WiFi, WiMAX, Wireless USB, Zigbee, Bluetooth and satellite, and/or hard wired connections such as internet, ADSL, DSL, cable modem, T1, T3, fibre, dial-up modem or the use of flash memory data cards, and USB memory sticks where appropriate.

The term "server system" is a system that includes but is not limited to one or more servers having computer processor and memory units, software modules, display screen, data inputs and outputs, connectors, wiring, circuit boards, power supply, and other electrical components needed to monitor, normalize, classify, store and communicate digital publication data to other devices via a network.

The term "client device" includes the hardware and/or software for accessing a service made available by a server system that is typically (but not always) on another computer system. Client devices include fat, thin and hybrid client devices including a mainframe computer, a server computer or server system, a computing device residing on-board a vehicle, a desktop computer, a laptop computer, a tablet computer, a home entertainment computer, a network computing device, a mobile computing device, a mobile communication device, a gaming device, a television set-top box/cable box, a computer integrated within a television (e.g., smart TV or internet enabled TV), a wearable computing device, or other suitable electronic device capable of accessing a service made available by a server.

Unless defined otherwise, all technical and scientific terms used herein have the same meaning as commonly understood by one of ordinary skill in the art to which this invention belongs.

According to one aspect of the present invention, a cloud-based digital publication aggregation and reporting service monitors publication across any suitable number and type of digital publication data providers, and reports publication information from within a particular geo-region or within proximity to a particular geo-location that is queried by a user.

Figure 1:
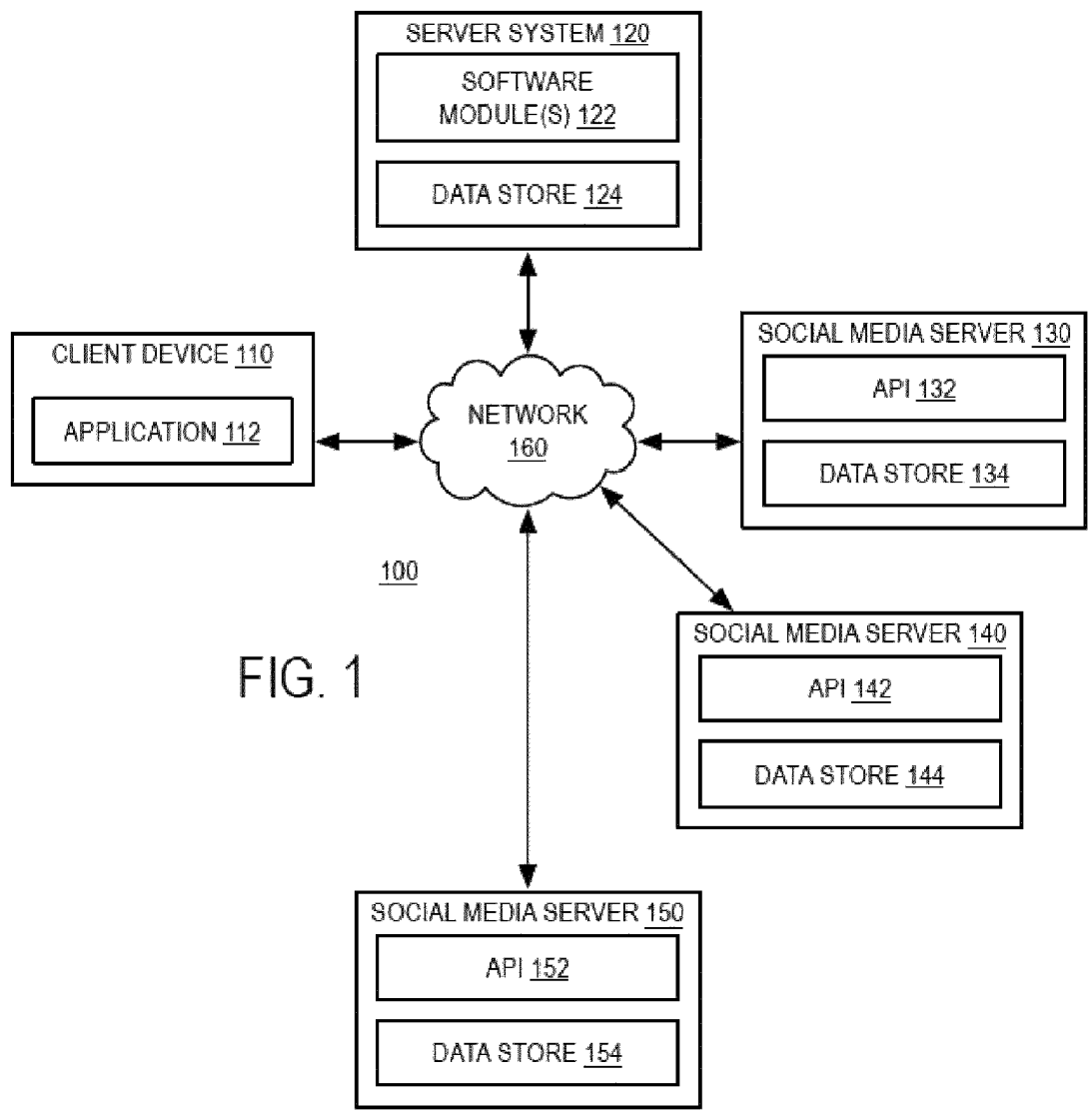
FIG. 1 is a schematic diagram depicting an exemplary computing environment with a server system connected via a network to a client device and $3^{rd}$ party servers having digital publication data.

FIG. 1 is a schematic diagram depicting an example computing environment 100 within which a variety of computing devices communicate or otherwise interact with each other over communications network 160. Communications network 160 may include a wide-area network, such as the Internet.

As one example, publication data provider servers 130, 140, and 150, host respective publication data provider services. Non-limiting examples of publication data providers include Facebook™, YouTube™, Twitter™, Foursquare™, Renren, Badoo™ Sina Weibo™, Instagram™, Panoramio™, Picasa™, GNIP™, and DataSift™ in addition to publication aggregation services, news services, weblogs, CCTV camera feeds. It will be understood that the various aspects of the present disclosure may be used with other publication data providers beyond these examples.

Publication data providers typically publish or otherwise make their publication information available to other services, applications, or clients via an application programming interface (API). The API enables the disclosed publication aggregation and reporting service to obtain publication information from various publication data providers.

Within computing environment 100, the disclosed publication aggregation and reporting service is represented by server system 120, and example publication data providers are represented by respective publication data provider servers 130, 140, and 150. Server system 120 obtains publication information from one or more of the publication data providers via respective APIs 132, 142, and 152 of the publication data provider servers 130, 140, and 150. Each API enables server system 120 to request and receive select publication information from respective data stores 134, 144, and 154 of the publication data provider servers 130, 140, and 150.

Publication information may include many forms of user interaction with a publication data provider, including user publications containing text, images, videos, user ratings, commentary, location-based "check-ins", etc. Publication information may include or otherwise be associated with geo-location information by one or more of the publication data providers, the users, and/or by the users' client devices through which the users interact with the publication data providers. The geo-location information may be user-reported and/or obtained for the client device via a Global Navigation Satellite System (GNSS) and/or one or more terrestrial-based access points. It will be understood that aspects of the present disclosure are not limited by the particular method used to associate geographic information with publications.

Publication information obtained by server system 120 from any number or type of publication data providers may be queried by a user for a particular geo-location or geo-region of interest. For example, a user operating client device 110 may submit queries to server system 120 and receive responses from server system 120 over communications network 160. Client device 110 is depicted executing an application program 112 that enables a user to interact with publication information aggregated by server system 120. Application program 112 may take the form of a general-purpose web browser or a special-purpose program that communicates with one or more of the software modules 122 executed at the server system.

Figure 3:
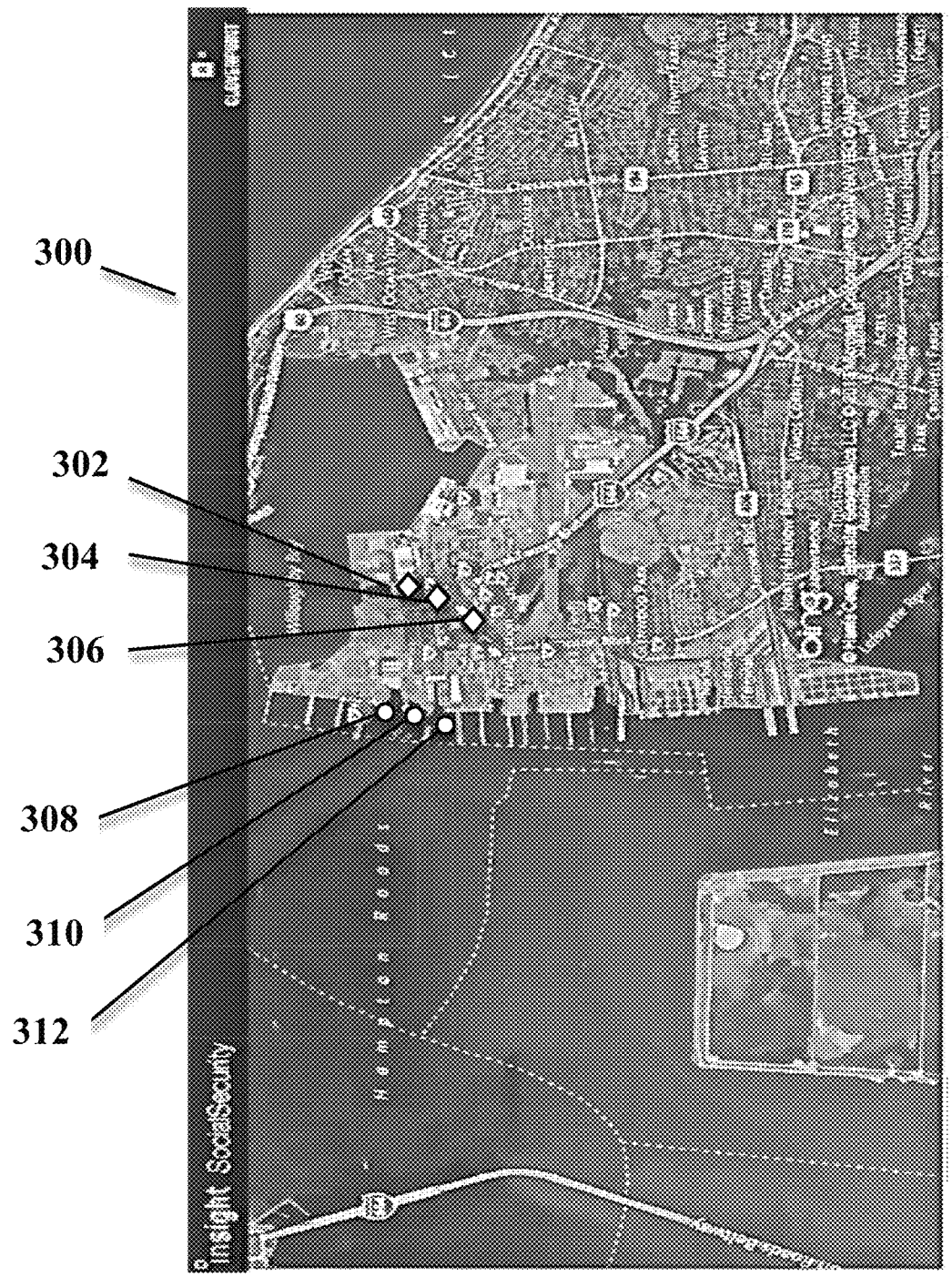
FIG. 3 depicts an exemplary graphical user interface for presenting publication information for a particular geo-location or geo-region of interest.
Figure 5:
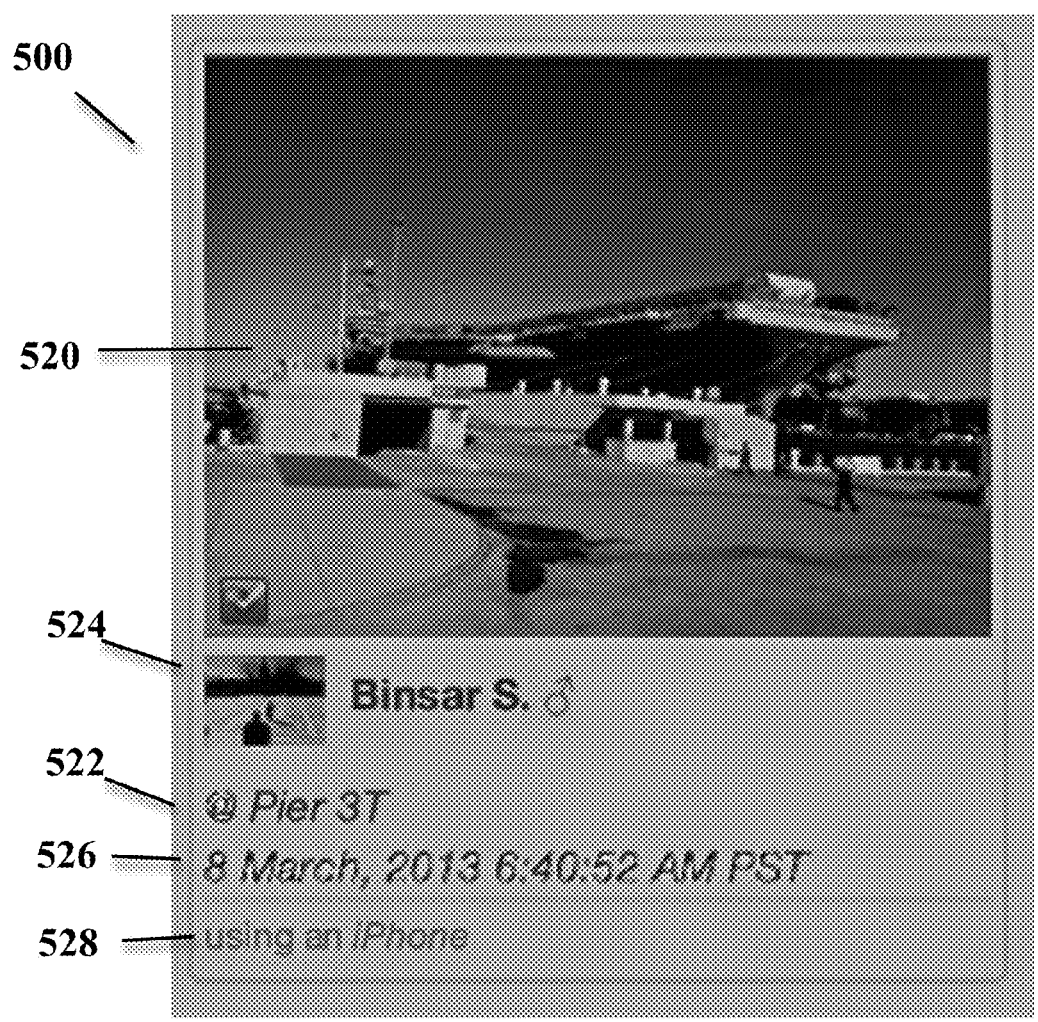
FIG. 5 depicts a third exemplary graphical user interface for presenting publication information for a geo-location or geo-region of interest.

Software modules 122 of server system 120 support and enable the functionality described herein with regards to the aggregation and reporting of publication information. As one example, software modules 122 may include one or more filter modules that enable a user to request and receive a filtered subset of the publication information obtained across a broad range of publication data providers as specified by filter parameters of a user initiated query. As another example, software modules 122 may include one or more user interface modules that provide the user with respective views of the reported publication information. Non-limiting examples of the user interfaces that may be supported by server system 120 for presentation at a client device include an authentication interface that enables a user to be authenticated by the server system, a query interface that enables a user to submit a query, a map interface or view as shown in FIG. 3, a list or summary interface or view as shown in FIG. 4, a granular interface or view as shown in FIG. 5, or any other suitable interface. The Server system 120 further includes a data store 124 where publication information obtained from publication data providers may be stored, processed, and/or accessed. The various computing devices described in the context of computing environment 100, including client devices, server devices, or server systems will be described in further detail with regards to an example computing system 600 of FIG. 6.

Figure 2:
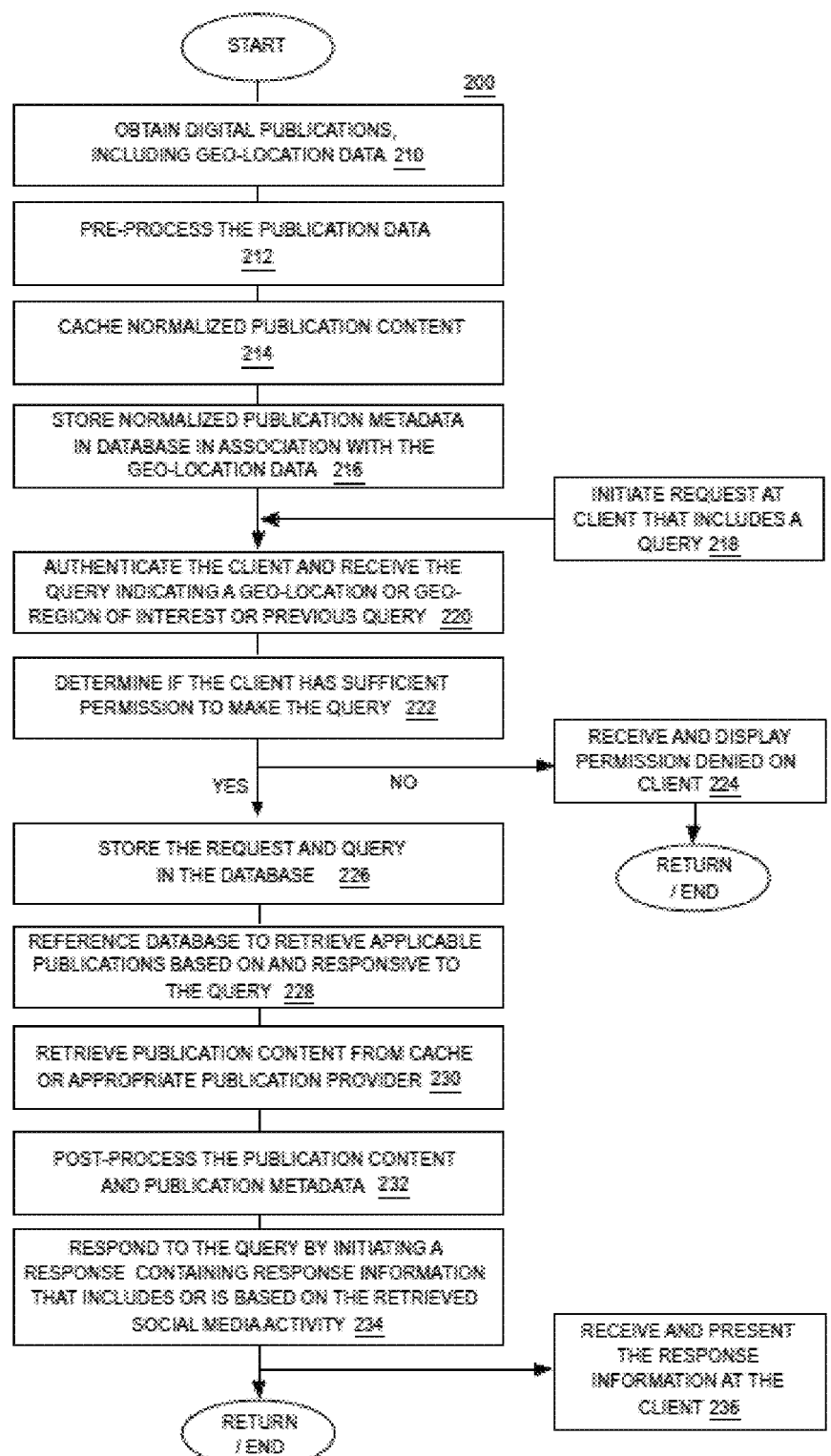
FIG. 2 is a flow diagram depicting an exemplary method for obtaining, processing, and reporting publication information for a geo-location or geo-region of interest.

FIG. 2 is a flow diagram depicting an example method 200 for obtaining, processing, and reporting publication information for a geo-location or geo-region of interest. As a non-limiting example, method 200 or portions thereof may be performed by a computing system, such as previously described server system 120 of FIG. 1 through cooperation with a client device.

At step 210, the method includes obtaining publication information, including geo-location data. As one example, the publication information may be obtained from one or more server devices of one or more publication data providers. The publication information may be obtained by requesting and receiving the publication information via respective application programming interfaces (APIs) of the one or more publication data providers. However, in some implementations, such as where a publication data provider does not provide access to information via its API, the method at step 210 may include obtaining the publication information by downloading, parsing, and storing content from the publication data providers. This approach may be referred to as "crawling" or "scraping" the content of the publication data provider.

Each item of publication information may be associated with one or more of a respective geo-location identifier, a time-stamp, a user-source identifier, and/or a publication data provider-source identifier. Hence, publication information may be attributed to a specific date and/or time, a specific user, and a specific publication data provider in addition to the geographic location or region.

At step 212, the method includes pre-processing the publication information to normalize, transform, filter, and/or augment the information from a received state to a stored state. As one example, multiple items of publication information may be indexed to specific geo-regions or geo-locations, specific users, and/or specific time-ranges across two or more (e.g., some or all) publication data providers. Additionally, publication information obtained from publication data providers may be processed to create a digest or summary of the type of publication, such as an indication of whether the publication was text, image, video, rating, "check-in", etc. In some implementations, pre-processing may not be performed.

At step 214, the method includes normalizing the publication information into a standardized format. The method at step 214, also includes the temporary storage of data, or caching, for performance increases and can include increasing the performance of the overall system.

At step 216, the method includes storing the normalized publication information meta-data in a database in association with the geo-location data. The publication information meta-data can include username, timestamp, a publication data provider identifier etc. The method at step 216 can include storing the publication information in original and/or processed form, including any derivative information obtained therefrom. In one implementation storage is based on the order the system received the publication data. Storage can also be based on the time the content was created.

At step 218, a client initiates a request that includes a query. The query may indicate a geo-location or geo-region of interest. As one example, the query may include or contain a geo-location identifier (e.g., an address) or geo-region identifier (e.g., one or more boundary definitions). For example, a user may draw a boundary on a map via a user interface to define a geo-region for the query. The query may additionally include or contain a proximity threshold definition to be used in combination with the geo-location specified by the query to form a geo-region (e.g., a circular region of the proximity threshold) within which publication information is to be reported. User initiated queries may contain additional parameters to be used to filter publication information, such as time range filters, publication data provider type filters, user-identity filters, publication type filters, and keyword filters.

At step 220, the method includes authenticating the client and receiving the query initiated by the client, or receiving a previous query from the authenticated client. In some implementations, authentication may be performed prior to submission and reception of queries. Authentication may be performed using any suitable approach, including the use of username/passwords, session tokens, multi-factor elements, in association with a security model such as Role Based Access Control (RBAC), Biba, etc. If the client is not authenticated, the query may be discarded, ignored, or not processed. In some implementations, authentication may not be performed.

At step 222, the method includes authenticating the client against permissions stored in a database. If the client does not have the required permissions, the request is rejected and the client displays a denied notification at step 224. The security model used to authenticate the client against permissions may be any acceptable security model, such as RBAC, Biba, etc.

At step 226, after a successful authentication of the client, the method includes storing the request for a query, and the query initiated by the client in the database. The method at step 226 may include storing the request or the query in original and/or processed form, including any derivative information obtained therefrom.

At step 228, the method includes referencing the database to retrieve applicable publication metadata based on and responsive to the query for the geo-location or geo-region of interest. At step 230 the method includes retrieving the appropriate content from the content cache or the appropriate publication data provider. At step 232, the method includes post-processing the publication information to transform, filter, and/or augment the information from a received or a stored state to a report state. In some implementations, post-processing may not be performed. A cache system is used to improve performance. In some implementations post-processing may include algorithms to additionally filter content for the client, for example to optimize searches for relevant content.

At step 234, the method includes responding to the query by initiating a response to the client containing response information that includes or is based on the retrieved publications for the geo-location or geo-region of interest. The response information may be further based on other suitable filter information contained in the query. Where post-processing is performed at step 232, the response information contains publication information in a report state. Where pre-processing is not performed at step 212, the response information contains publication information in the previously described received state or stored state depending on whether pre-processing was performed.

In some implementations, operations 220, 222, 224, 226, 228, 232 and/or 234 may be performed prior to the previously described operations 210, 212, and/or 214. As one example, applicable publication information may be obtained from one or more of the publication data providers on behalf of a user responsive to receiving the query from the user's client device. For example, operation 210 where publication information is obtained may include requesting and receiving the publication information in the form of a subset of publication information attributed to the geo-location or geo-region of interest based on and responsive to the query received from the client. This approach may be referred to as dynamic querying of the publication data providers responsive to client initiated queries.

As another example, the platform may obtain a broader range of publication information (e.g., all of the publication information) from one or more publication data providers, and report only a subset of that information responsive to receiving a query from a user for publication information attributed to a particular geo-location or geo-region. For example, the method at step 232 may include filtering of the publication information based on and responsive to the geo-location or geo-region of interest indicated by the query to obtain a subset of publication information attributed to the geo-location or geo-region of interest.

At step 236, the client receives the response information, and presents the response information to the user. The response information typically includes a subset of publication information attributed to the geo-location or geo-region of interest. FIGS. 3, 4, and 5 depict example user interfaces through which response information may be presented.

In at least some implementations, publication information reported to client device users is associated with other data sources to provide a comprehensive view of publications in a selected geo-location or geo-region of interest. For example, the location of physical objects of interest within a geo-region or within a threshold proximity to a geo-location may be included in the response information reported to and presented by the client device. These physical objects may be specified by the user as part of the query using any suitable object identifier. As one example, a user may specify one or more physical objects of interest (e.g., landmarks) with the query along with the geo-location and/or geo-region identifier.

In at least some implementations, users may track changes in publication information occurring over time based on a historical view of the publication information. This feature enables users to track publication information against a baseline of historical information, thereby enabling spike detection or lull detection with respect to the baseline. Spikes, lulls, or other changes in volume and/or frequency of publication information may indicate the occurrence of an event, incident, or flashmob type activity within a particular geo-region or within proximity to a particular geo-location. In one example, queries may indicate a volume and/or frequency deviation threshold responsive to which response information is to be generated for the user (e.g., an alert) if the volume and/or frequency of publications exceed the deviation threshold with regards to the historic baseline for the geo-region or geo-location of interest.

In at least some implementations, users may query the aggregated publication information for keywords or hashtags (for example, specific text or terms such as "bomb") within the publication information, or identify people located within a geo-region or within proximity to a geo-location at a particular time or within a particular time range. The user is then presented with graphical indicators that identify geo-locations within the geo-region that are attributed to the publication information.

In at least some implementations, users may annotate the publication information, the publication response to the query initiated by the client, or other programmatic objects created by the system. An annotation request may comprise one or more of a specified system object, client/user permissions, and/or notification parameters.

Figure 9:
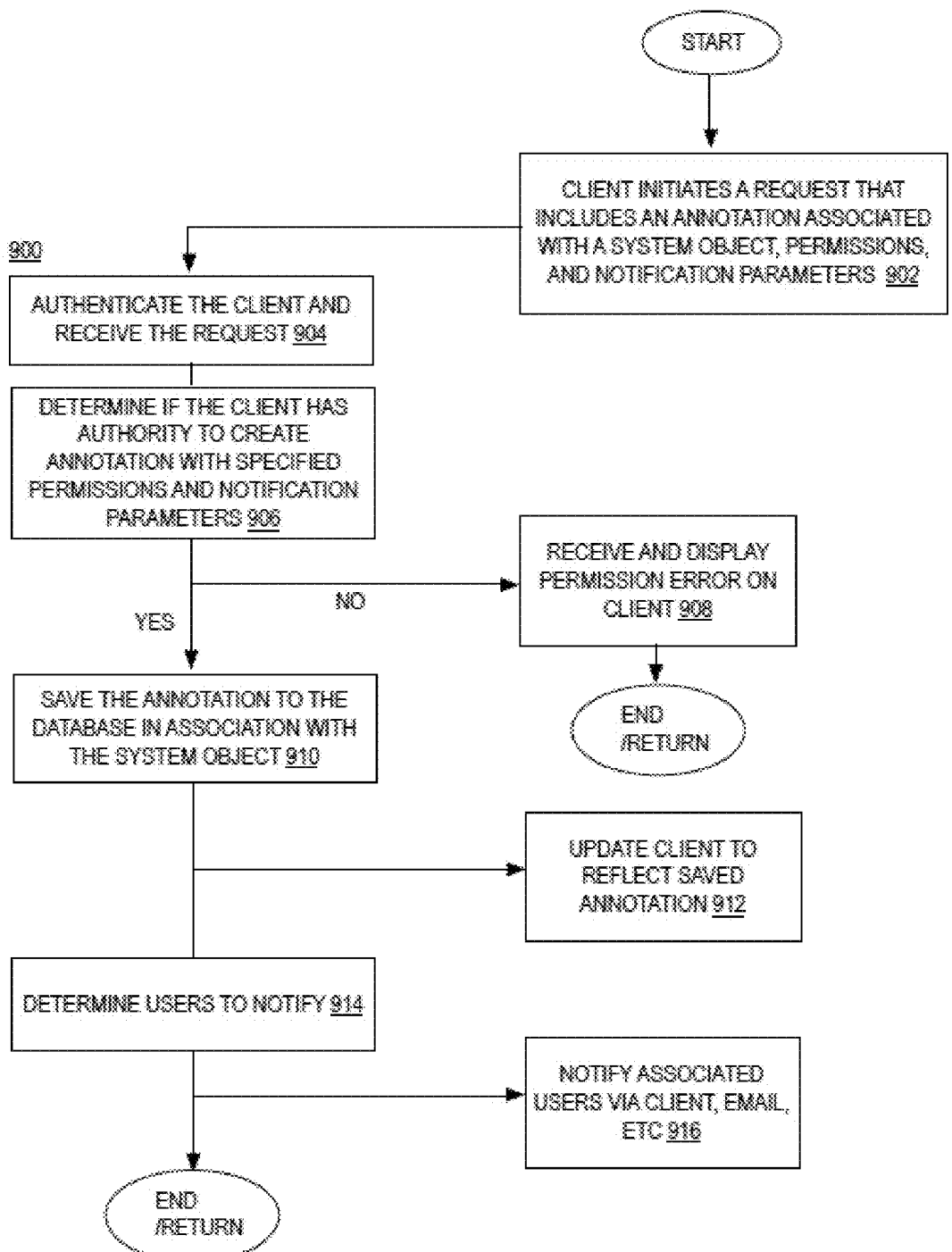
FIG. 9 is a flow diagram depicting an exemplary method for sharing system objects.

FIG. 9 shows an exemplary method 900 depicting a method for annotating queries, publication information, or other system objects. This includes at step 902 the receipt of a request initiated by the client. The initiated request may comprise one or more of a specified system object, client permissions, and/or notification parameters.

At step 904, the method includes authenticating the client with an appropriate security model, such as Role Base Access Control, Biba, etc and receiving the client request. At step 906, logic is implemented to determine if the client has the required permissions to create an annotation with the specified permissions, and parameters included in the original annotation request initiated by the client. This includes the receipt and display of a permission error message on the client at step 908 if the client has inadequate permissions for the original annotation request.

At step 910, if the permissions were adequate for the creation of an annotation as per the original request, the method includes saving the annotation in the database in association with the system object specified in the original client request. This includes notifying the client of a successfully saved annotation at step 912.

The users who require a notification of the saved annotation are determined at step 914 and those identified users are notified of an annotation at step 916 via email, client update or other appropriate method.

In at least some implementations, a user may share the publication information, the publication response to the query initiated by the client, or other programmatic objects created by the system including annotations. Sharing is facilitated through the modification and authentication of the permissions associated with system objects. To share a system object with one or more other clients, the primary client will modify the permissions of the system object such that one or more secondary clients have the permissions to view the system object. Further, the primary client will then notify the one or more secondary clients that the sharing operation has been completed.

Figure 10:
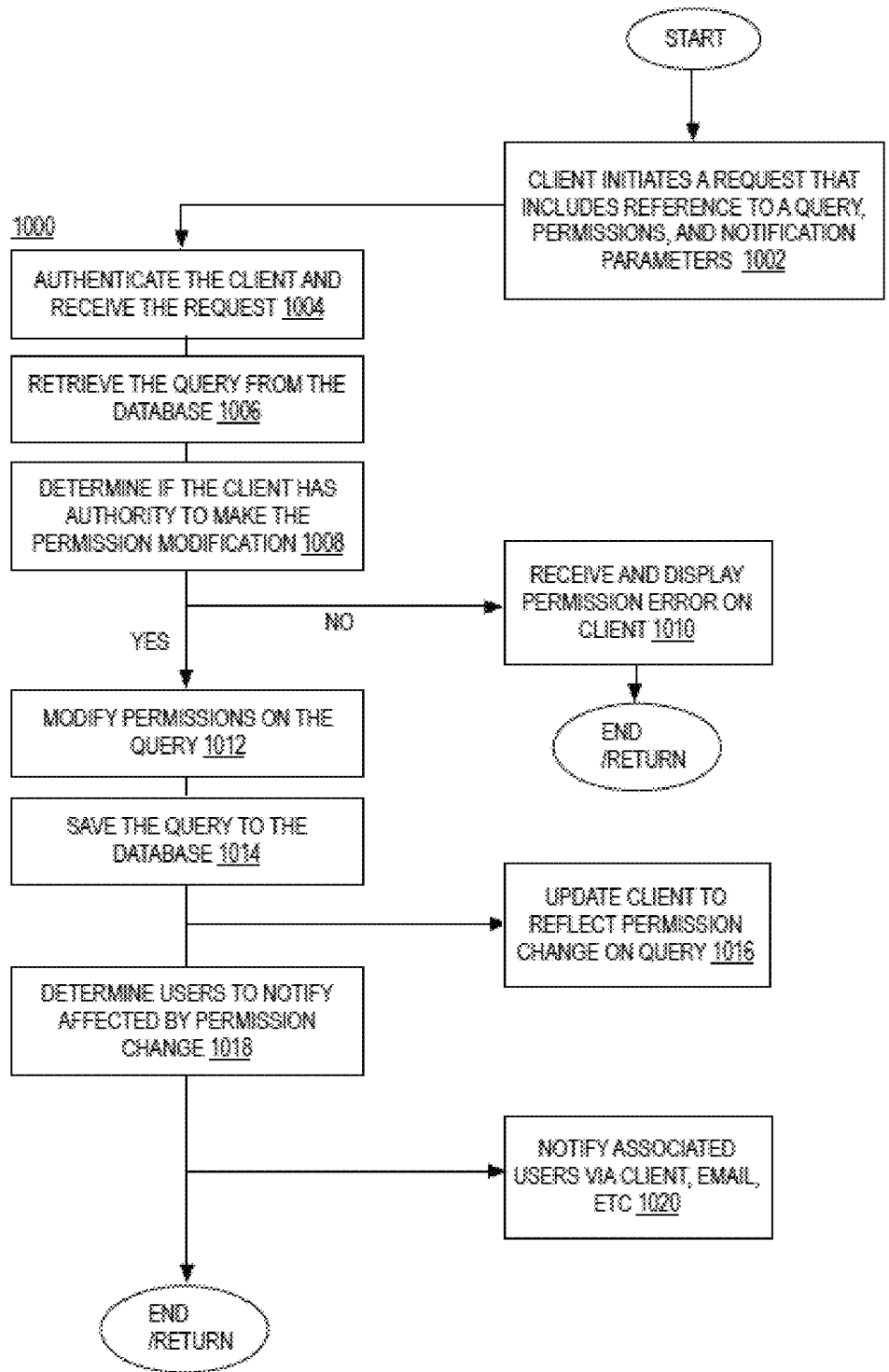
FIG. 10 is a flow diagram depicting an exemplary method for annotating system objects.

FIG. 10 depicts one exemplary method 1000 for sharing system objects from a primary client to one or more secondary clients. At step 1002, the primary client receives a request for a modification of the permissions on a query, publication information, or other system object. At step 1004, the client is authenticated with an appropriate security model, such as Role Base Access Control, Biba, etc. The method then further includes receiving the request for an object permissions change from the primary client.

The query, publication information or system object of interest is retrieved at step 1006 from the database, and includes determining if the primary client has sufficient permissions at step 1008 to modify the permissions of the query, publication information, or system object of interest. At step 1010, if the permissions of the primary client are insufficient to modify the permissions of the system object of interest, the method includes receiving and displaying a permission error to the primary client. However, at step 1012, if the permissions of the primary client are sufficient, the system object permissions are modified according to the original request initiated by the primary client.

The permission modified query, publication information, or system objects are saved to the database at step 1014. At step 1016, the method includes updating the primary client to reflect the successful change of permissions. Which of the one or more secondary clients to notify is determined at step 1018 based on the new permissions associated with the system object of interest. Finally, at step 1020, the method includes notifying the one or more secondary clients of the permission modification on the object of interest via email, client update or other appropriate method.

FIGS. 3, 4 and 5 depict exemplary graphical user interfaces for presenting publication information for a geo-location or geo-region of interest. FIG. 3 depicts an exemplary map view 300 that may be presented via a graphical user interface at a client device. The map view of FIG. 3 includes a plurality of geo-location indicators, that each represents respective publication information items such as 302, 304 and 306 attributed to the indicated geo-location. The map view of FIG. 3 further includes a plurality of geo-location indicators that each represent physical objects 308, 310 and 312 (e.g., ships or other landmarks) attributed to the indicated geo-location. The map view of FIG. 3 depicts an exemplary geo-location or geo-region of interest, such as a portion of Norfolk, Va., for example. The geo-location indicators of FIG. 3 that represent individual publication information items and/or physical objects may be filtered from a broader range of information based on any of the previously described query parameters, such as keywords, user identifiers, and time ranges.

FIG. 4 depicts an exemplary list view that may be presented via a graphical user interface at a client device. Objects or items presented by the list view of FIG. 4 may correspond to the objects or items depicted in the map view of FIG. 3. The list view of FIG. 4 includes publication information obtained from at least two different publication data providers—Foursquare™ 430 and Twitter™ 440 for the geo-location or geo-region of interest. The publication information in this example includes a quantity of current check-ins 434 (i.e., Here Now), a total quantity of check-ins 436 (i.e., Total Checkins), and total quantity of users 438 (i.e., Total Users) on a per geo-location basis for the geo-region of interest. The list view of FIG. 4 further includes a list of physical objects 420 (e.g., ships or other landmarks) that are described by name 422 and type 424 for the geo-location or geo-region of interest.

FIG. 5 depicts an example of a granular view of a publication information item that may be presented via a graphical user interface at a client device. The publication information item includes an image of an object 520 (e.g., a ship or other suitable indicator) located at a geo-location 522 (e.g., Pier 3T) within the geo-region of interest, along with a user identifier 524 attributed to the publication, a time stamp 526 for that publication, and an indication of the type of client device 528 attributed to that publication (e.g., an iPhone™ mobile device). The publication information item may correspond to one of a plurality of publication information items summarized by the views of FIGS. 3 and 4.

As previously discussed, the above described methods and processes may be tied to a computing system including one or more computing devices. In particular, the methods and processes described herein may be implemented as one or more applications, services, application programming interfaces, computer libraries, and/or other suitable computer programs or instruction sets.

Figure 6:
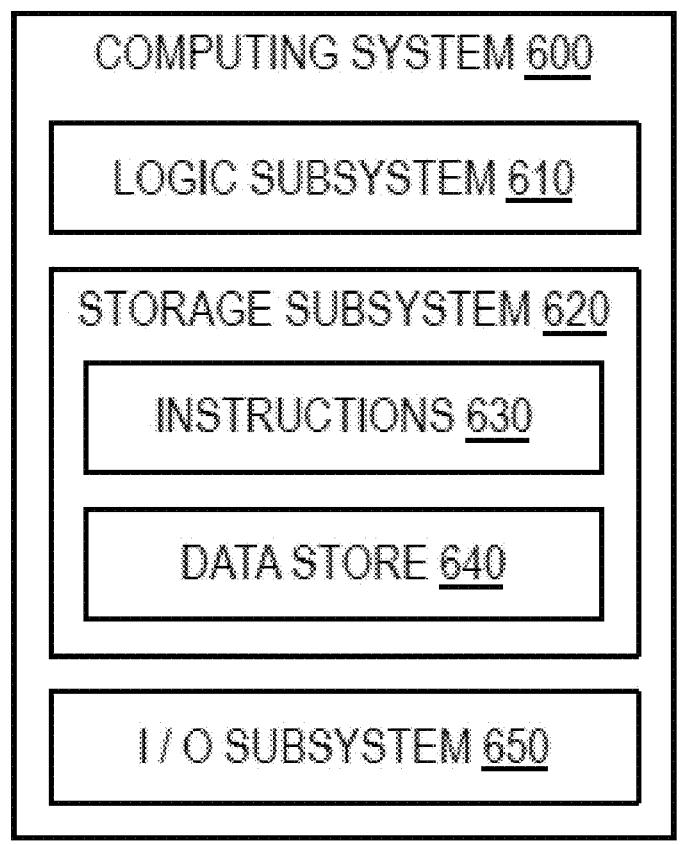
FIG. 6 is a schematic diagram depicting an exemplary computing system for any general purpose computing task including digital publication monitoring.

FIG. 6 is a schematic diagram depicting an exemplary computing system 600 that may perform one or more of the above described methods and/or processes. Computing system 600 is shown in simplified form. It is to be understood that virtually any computer architecture may be used without departing from the scope of this disclosure. Computing system 600 or portions thereof may take the form of one or more of a mainframe computer, a server computer or server system, a computing device residing on-board a vehicle, a desktop computer, a laptop computer, a tablet computer, a home entertainment computer, a network computing device, a mobile computing device, a mobile communication device, a gaming device, a television set-top box/cable box, a computer integrated within a television (e.g., smart TV or internet enabled TV), a wearable computing device, or other suitable electronic device. In the context of a server system, computing system 600 may take the form of one or more server devices that are co-located at a common location or geographically distributed across two or more locations.

Computing system 600 includes a logic subsystem 610 and a computer readable information storage subsystem 620. Computing system 600 may further include an input/output subsystem 650. Logic subsystem 610 may include one or more physical devices configured to execute instructions, such as example instructions 630 held in storage subsystem 620. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 610 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 620 includes one or more physical, non-transitory, devices configured to hold data in data store 640 and/or instructions 630 executable by the logic subsystem to implement the herein described methods and processes. When such methods and processes are implemented, the state of storage subsystem 620 may be transformed (e.g., to hold different data or other suitable forms of information).

Storage subsystem 620 may include removable media and/or built-in devices. Storage subsystem 620 may include optical memory devices (e.g., CD, DVD, HD-DVD, Blu-Ray Disc, etc.), semiconductor memory devices (e.g., FLASH, RAM, EPROM, EEPROM, etc.) and/or magnetic memory devices (e.g., hard disk drive, floppy disk drive, tape drive, MRAM, etc.), among others. Storage subsystem 620 may include devices with one or more of the following characteristics: volatile, nonvolatile, dynamic, static, read/write, read-only, random access, sequential access, location addressable, file addressable, and content addressable. In at least some implementations, the logic subsystem and storage subsystem may be integrated into one or more common devices, such as an application specific integrated circuit or a system on a chip.

It is to be appreciated that storage subsystem 620 includes one or more physical, non-transitory devices. In contrast, in at least some implementations and under select operating conditions, aspects of the instructions described herein may be propagated in a transitory fashion by a pure signal (e.g., an electromagnetic signal, an optical signal, etc.) that is not held by a physical device for at least a finite duration.

Furthermore, data and/or other forms of information pertaining to the present disclosure may be propagated by a pure signal.

The terms "module" or "program" may be used to describe an aspect of a computing system that is implemented to perform one or more particular functions. In some cases, such a module or program may be instantiated via logic subsystem 610 executing instructions held by storage subsystem 620. It is to be understood that different modules or programs may be instantiated from the same application, service, code block, object, library, routine, API, function, etc. Likewise, the same module or program may be instantiated by different applications, services, code blocks, objects, routines, APIs, functions, etc. The terms "module" or "program" are meant to encompass individual or groups of executable files, data files, libraries, drivers, scripts, database records, etc. Examples of software include an operating system, an application program such as the previously described authoring application program and/or viewer application program, a plug-in, a software update, a software portion, or combinations thereof.

It is to be appreciated that a "service", as used herein, may be an application program or other suitable instruction set executable across multiple sessions and available to one or more system components, programs, and/or other services. In at least some implementations, a service may run on a server or collection of servers responsive to a request from a client.

Input/output subsystem 650 may include and/or otherwise interface with one or more input devices and/or output devices. Examples of input devices include a keyboard, keypad, touch-sensitive graphical display device, touchpanel, a computer mouse, a pointer device, a controller, an optical sensor, a motion and/or orientation sensor (e.g., an accelerometer, inertial sensor, gyroscope, tilt sensor, etc.), an auditory sensor, a microphone, etc. Examples of output devices include a graphical display device, a touch-sensitive graphical display device, an audio speaker, a haptic feedback device (e.g., a vibration motor), etc. When included, a graphical display device may be used to present a visual representation of data held by the storage subsystem. As the herein described methods and processes change the data held by the storage subsystem, and thus transform the state of the storage subsystem, the state of the graphical display may likewise be transformed to visually represent changes in the underlying data.

Input/output subsystem 650 may further include a communication subsystem that is configured to communicatively couple computing system 600 with one or more other computing systems or computing systems. The communication subsystem may include wired and/or wireless communication devices compatible with one or more different communication protocols. As an example, the communication subsystem may be configured for communication via a wireless telephone network, a wireless local area network, a wired local area network, a wireless personal area network, a wired personal area network, a wireless wide area network, a wired wide area network, etc. In at least some implementations, the communication subsystem may enable the computing system to send and/or receive messages to and/or from other devices via a communications network such as the Internet, for example.

Input/output subsystem 650 may also further include one or more modules or programs, including other databases, to further manipulate or store the data, whether accessed through a network or one or more data stores associated with the data store 640. The acquisition of the data by the one or more modules or programs may be as a push from the data store 640 or as a pull from the data store 640 from one or more modules or programs.

In FIG. 7, an implementation of the server back-end is shown starting at step 700 proceeding to step 710 and if ready for data then proceeding to retrieve new content from the publication data providers at step 720. This may be an active process, whereby the system dispatches one or more requests to the publication data providers. It may also be a passive process, whereby the system receives data pushed from publication data providers, for instance as part of a stream.

At step 730, the content is normalized into a single format. Each publication data provider has a unique format for the publications they provide. The system converts these unique formats into a single, uniform structure that can be used by the rest of the system.

At step 740, the system stores the publication's metadata in the database. This database will be queried by the system front-end during user requests (see FIG. 8). The metadata stored includes the fields on which subsequent searches will be performed, for instance geo-spatial coordinates, publication author, or relevant keywords.

At step 750, the publication's content is cached. This cache allows subsequent requests for the data to be performed efficiently. At step 760, the entire system then repeats until terminated via external request. This causes the system to perpetually retrieve new data as it becomes available.

FIG. 8 depicts an implementation of the system's server. The system component described by FIG. 8 handles user requests for information. Proceeding from start at step 800, a user authenticates with the system at step 810. This authentication includes an account name along with one or more additional authentication elements, such as a password, security question, third-party authentication key, or biometric information. At step 820, a user request for data is received by the system. This step may include validation of the input parameters. The system will determine what data the user is attempting to retrieve, which may include publications, annotations, or other objects stored by the system.

At step 830, the system verifies that the user has permission to view the data they have requested. Permission depends on the authentication credentials provided by the user in step 810. Permission may depend on user-level restrictions, whereby certain users are prevented from reading or deleting objects. Permission may also depend on object-level restrictions, whereby users are given or denied access on specific objects.

At step 840, the requested data is retrieved. If the requested data is present in the database, the system retrieves it directly. If the requested data is not present in the database, the system must retrieve it from third-party sources. For instance, if a request is made for publication content, and the content is not cached in the database, a request must be sent to the correct publication data provider to acquire that data.

At step 850, the requested data is returned to the client. Any content fetched from third-party sources during this lookup may be cached, to reduce the number of future third-party lookups required and then the operation ends at step 860.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof. It should be understood that the disclosed embodiments are illustrative and not restrictive. Variations to the disclosed embodiments that fall within the metes and bounds of the claims, now or later presented, or the equivalence of such metes and bounds are embraced by the claims.

We claim:

1. A method performed by a server system of one or more server devices for monitoring digital publications by their geo-location of origin, the method comprising:
   obtaining, by the server system, digital publication information including multiple publication items from two or more further server devices of two or more digital publication data providers, wherein each of the publication items is originated from a respective user device located at a respective geographic location indicated by geo-location data associated with that publication item;
   normalizing publication information across the two or more digital publication data providers to obtain normalized publication information having a uniform structure;
   storing the normalized publication information in a database in association with the geo-location data;
   authenticating a client;
   receiving a query initiated by the client at the server system, the query indicating a geo-location or geo-region of interest submitted by a user operating the client, and further indicating one or more additional filter parameters including a threshold deviation in a volume and frequency of publications relative to a historic baseline;
   referencing the normalized publication information in the database to retrieve applicable publication information based on and responsive to the query for the geo-location or geo-region of interest;
   filtering the applicable publication information retrieved for the geo-location or geo-region of interest based on and responsive to the one or more additional filter parameters contained in the query to obtain filtered publication information;
   responding to the query by initiating a response to the client containing response information that includes or is based on the filtered publication information for the geo-location or geo-region of interest;
   following authentication of the client, annotating as one or more annotations, one or more publication items of the filtered publication information;
   saving the one or more annotations in the database in association with the one or more publication items of the filtered publication information; and
   sharing the one or more annotations with another client over a communications network.

2. The method of claim 1, further comprising:
   wherein obtaining the digital publication information from the two or more further server devices includes requesting and receiving the digital publication information via respective application programming interfaces of the two or more digital publication data providers over a communications network.

3. A server system of one or more server devices for monitoring digital publications by their geo-location of origin, the server system comprising:
   one or more processors; and
   a memory storing computer executable code, which, when executed by the one or more processors cause the server system to:
      obtain digital publication information including multiple publication items from two or more server devices of two or more digital publication data providers, wherein each of the publication items is originated from a respective user device located at a respective geographic location indicated by geo-location data associated with that publication item;
      normalize publication information across the two or more digital publication data providers to obtain normalized publication information having a uniform structure;
      store the normalized publication information in a database in association with the geo-location data;
      authenticate a client;
      receive a query from the client, the query indicating a geo-location or geo-region of interest submitted by a user operating the client, and further indicating one or more additional filter parameters including a threshold deviation in a volume and frequency of publications relative to a historic baseline;
      reference the normalized publication information in the database to retrieve applicable publication information based on and responsive to the query for the geolocation or geo-region of interest;
      filter the applicable publication information retrieved for the geo-location or geo-region of interest based on and responsive to the one or more additional filter parameters contained in the query to obtain filtered publication information;
      respond to the query by initiating a response to the client containing response information that includes or is based on the filtered publication information for the geolocation or geo-region of interest;
      following authentication of the client, annotate one or more responses including the response initiated to the client, as one or more annotations;
      save the one or more annotations in the database in association with the one or more responses; and
      share the one or more annotations with another client over a communications network.

4. The server system of claim 3, further comprising:
   wherein the server system obtains the digital publication information from the two or more further server devices by requesting and receiving the digital publication information via respective application programming interfaces of the two or more digital publication data providers over a communications network.

5. A method performed by a server system of one or more server devices for monitoring digital publications by their geo-location of origin, the method comprising:
   obtaining, by the server system, digital publication information including multiple publication items from two or more further server devices of two or more digital publication data providers, wherein each of the publication items is originated from a respective user device located at a respective geographic location indicated by geo-location data associated with that publication item;

normalizing publication information across the two or more digital publication data providers to obtain normalized publication information having a uniform structure;

storing the normalized publication information in a database in association with the geolocation data;

authenticating a client;

receiving a query initiated by the client at the server system, the query indicating a geolocation or geo-region of interest submitted by a user operating the client, and further indicating one or more additional filter parameters including a threshold deviation in a volume and frequency of publications relative to a historic baseline;

referencing the normalized publication information in the database to retrieve applicable publication information based on and responsive to the query for the geo-location or geo-region of interest;

filtering the applicable publication information retrieved for the geo-location or geo-region of interest based on and responsive to the one or more additional filter parameters contained in the query to obtain filtered publication information;

responding to the query by initiating a response to the client containing response information that includes or is based on the filtered publication information for the geo-location or geo-region of interest;

following authentication of the client, annotating as one or more annotations, one or more queries initiated by the client including the query received at the server system;

saving the one or more annotations in the database in association with the one or more queries; and sharing the one or more annotations with another client over a communications network.

6. The method of claim 5, further comprising:

wherein obtaining the digital publication information from the two or more further server devices includes requesting and receiving the digital publication information via respective application programming interfaces of the two or more digital publication data providers over a communications network.

* * * * *